United States Patent [19]
Dunn et al.

[11] Patent Number: 5,916,302
[45] Date of Patent: Jun. 29, 1999

[54] MULTIMEDIA CONFERENCING USING PARALLEL NETWORKS

[75] Inventors: James M. Dunn, Ocean Ridge, Fla.; Colin George Harrison, Brookfield, Conn.; Edith Helen Stern; James J. Toohey, both of Boca Raton, Fla.; Barry Edward Willner, Briarcliff Manor, N.Y.

[73] Assignee: International Business Machines Corporation, Armonk, N.Y.

[21] Appl. No.: 08/761,249

[22] Filed: Dec. 6, 1996

[51] Int. Cl.[6] .................................................. G06F 13/00
[52] U.S. Cl. .......................... 709/204; 370/259; 370/260; 370/351; 370/270; 379/202; 365/189.01
[58] Field of Search ..................... 395/200.34, 200.35, 395/200.58; 348/14, 15, 16, 17; 706/246, 275; 370/259, 260, 351; 365/189.01; 379/202

[56] References Cited

U.S. PATENT DOCUMENTS

| | | | |
|---|---|---|---|
| 3,674,936 | 7/1972 | Wolfe | 179/1.5 |
| 4,499,577 | 2/1985 | Baranyai et al. | 370/62 |
| 4,589,107 | 5/1986 | Middleton et al. | 370/62 |
| 4,734,907 | 3/1988 | Turner | 370/60 |
| 5,341,374 | 8/1994 | Lewen et al. | 370/85.4 |
| 5,610,910 | 3/1997 | Focsaneanu et al. | 370/351 |
| 5,617,539 | 4/1997 | Ludwig et al. | 395/200.34 |
| 5,719,921 | 2/1998 | Vysotsky et al. | 706/246 |

FOREIGN PATENT DOCUMENTS

WO95/10917   4/1995   WIPO .............................. H04N 7/10

OTHER PUBLICATIONS

TRA, "Understanding Emerging Technologies in Telecommunication™" 1984–1998, p. 50.

Primary Examiner—Dung C. Dinh
Assistant Examiner—Hieu C. Le
Attorney, Agent, or Firm—Richard A. Tomlin; Robert Lieber

[57] ABSTRACT

A conference server system, for internal use in the public switched telephone network (PSTN), links to public data communication networks (e.g. the Internet) for distributing computer displayable data between participants in voice telephone conferences. The server system includes a computer sub-system for storing data generated by the participants and distributing the data in coordination with voice presentations of respective participants. Data so stored and distributed includes computer-displayable data. Other data handled by the computer subsystem represents commands and functional requests issued by participants which pertain to the handling of computer-displayable data and voice parameters of the conference. Conference participants, having separate and concurrent access to both the PSTN and the data network, receive and view computer-displayable data prepared by one of the participants in coordination with the respective voice conference. The conference server system connects to voice conference management resources of the PSTN in a manner enabling the server system to control voice parameters of a voice conference in response to data requests received from participants (e.g. requests from hearing-impaired participants for enhanced audio service), as well as enabling the conference management resources to control functions performed in respect to distribution of displayable data in response to spoken requests uttered by the participants, when the telephone system contains appropriate speech recognition equipment. Telephone system conferences utilizing the present conference server system have the advantage of being usable to support voice-only and/or data-only participants (participants respectively linked to only the voice or data distribution parts of a conference session), as well as to provide conference service between exactly two participants which may be more effective than comparable services that the same two participants would obtain using a direct dial-up telephone connection for voice and a public data network connection completely isolated from the voice conference management resources of the PSTN to exchange data.

17 Claims, 6 Drawing Sheets

MULTIMEDIA CONFERENCING USING PARALLEL NETWORKS

CROSS-REFERENCE TO RELATED PATENT APPLICATIONS

Patent application Ser. No. 08/761,527 by J. M. Dunn et al, entitled USER INVOCATION OF SERVICES IN PUBLIC SWITCHED TELEPHONE NETWORK VIA PARALLEL DATA NETWORKS and filed on the same date as the present application, discloses a telephone call management system for a PSTN (public switched telephone network) enabling users of that network to invoke or disable services (e.g. call waiting, call blocking, call forwarding, etc.) via public data networks like the Internet, and via user actions independent of telephone call activity; e.g. while a telephone connection is active or while the user's telephone is idle (on-hook). The present invention concerns extension of certain teachings of the referenced application to telephone conferences.

BACKGROUND OF THE INVENTION

This invention relates to multimedia conferencing via the public switched telephone network (hereafter, the PSTN) and data networks external to the PSTN. As used herein, "multimedia conferencing" means voice telephone conferences accompanied by presentations of displayable images, and the PSTN refers to equipment throughout the world enabling users of voice telephones (private and public ones) to connect to each other, including mobile radio systems but excluding equipment maintained or leased for exclusive use of private enterprises (PBX's, leased lines, etc.) as well as public data transmission systems capable of handling voice transmissions (e.g. the Internet and World Wide Web). More specifically, this invention concerns a system for multimedia conferencing wherein conference participants can coordinate display of images (e.g. charts) with voice presentations, and also directly control or administer functions or services of the PSTN that normally are inaccessible while a conference session is active.

Present conference management resources of the PSTN support conferencing services between voice telephone users wherein two or more users remote from one another (hereinafter, participants, conferees or attendees) can converse as if connected to a party line. In addition to overseeing connections between participants, these management resources control other conference parameters, such as the maximum number of participants to be accommodated, the maximum duration of the session, connection of new participants, notification of participants when a new participant is added, etc.

The present infrastructure of the PSTN also allows for direct transmission of data between PSTN subscribers (e.g. facsimile data, computer data, etc.), and may be used to support transmission of data between parts of global data networks like the Internet and World Wide Web (hereafter, the Web or WWW). Parts of such data networks are physically and logically external to the PSTN in that they do not form or take part in forming end-to-end connections between ordinary voice telephones in response to direct dialing (or tone keying). Parts external to the PSTN include for instance equipment maintained by Internet access providers, which is not subject to control by the PSTN, even when conducting transmissions over the data network and even if connected to the PSTN while doing so. Notably, in addition to lacking control of such external parts, the PSTN has no control over the routing of transmissions between them via transmission lines in the data network.

Furthermore, even if voice signals are transmitted through the data network, the PSTN has no control over their routing within the data network. Hence, even parts of the Internet/Web that may carry voice signals are external to the PSTN, even if the signals are generated and/or reproduced in telephones or telephone-like apparatus (e.g. microphones and speakers connected to computers and conveyed through modems), if the PSTN can not control those parts.

Similarly, private networks containing transmission lines leased from the PSTN (T1 lines, T2 lines, etc.), may include parts that are not subject to PSTN control, which therefore are external to the PSTN regardless of what signals they carry (data, voice, or other).

Consequently, users of PSTN conferencing services can not presently operate through either external networks or their telephones to administer complex services within the PSTN; particularly, while a conference is in session.

The present invention seeks to overcome conferencing limitations of both the PSTN and networks external thereto (particularly, public data networks like the Internet and Web), to enable participants in a multimedia conference to use external networks to vary services received in the PSTN during the conference; without required intervention of PSTN operators or other PSTN representatives. This is accomplished by outfitting the PSTN with conference servers that are administered and controlled by the PSTN but have links to external networks. The conference servers are so constructed and located as to enable participants in a multimedia conference to control distribution of display images to other participants through public data networks (e.g. the Internet) in coordination with their voice presentations, and to permit such control at a cost that can be attractive to both the PSTN and its customers. The conference servers are also so constructed and configured within the PSTN as to allow participants in a multimedia conference to control services internal to the PSTN (both existing services such as conference outdialing and new ones) by means of signal requests communicated through external networks.

SUMMARY OF THE INVENTION

In accordance with our invention, voice and data signal portions of a multimedia conference session are transferred over different paths, the voice over a path wholly internal to the PSTN and the data over a path partially external to the PSTN which is part of a data network like the Internet or Web. The data in the data path is funneled through a conference server administered and controlled by the PSTN which is also linked within the PSTN to internal conference management and conference connection resources of the PSTN.

During a multimedia conference, voice (or other audio) signals pass between conferees through conventional switch circuits and conference bridge circuits that are internal to the PSTN and that are administered by conventional conference management resources of the PSTN. However, data signals in the same conference (image data and other data) may be routed via a conference server over a public data network external to the PSTN, like the Internet or Web. Each such conference server is administered and controlled by the PSTN and has links to conference connection and conference management resources of the PSTN, such that a conference participant making a voice presentation can furnish image data to the conference server during or prior to the presentation, have the data stored in the conference server, and then have the data uploaded from the conference server to the other participants in precise coordination with parts of the voice presentation referring specifically to respective display images. Connections between conference participants and public data networks linked to a conference server may be dialed (tone keyed) telephone system connections or direct connections through e.g. privately maintained lines and/or networks.

Each conference server and its aforesaid links within the PSTN is also useful to allow conferees to control operational services within both the PSTN and the external data network, both before and during a conference.

In respect to coordinated transfer of image data, a conference server storing data furnished by a conference participant can be requested by that participant to distribute the data to other conference participants. The request can be sent through either the external data network (e.g. as a data signal representing the request) or through the PSTN conference connection as spoken commands if the PSTN is suitably equipped for detecting and reacting to such commands.

In respect to user control of conditions or services internal to the PSTN, such control can be used to interrupt a speaker in the conference; e.g. by a request over the data network causing the conference server to have images displayed to conferees (including the speaker) modified to show an indication requesting interruption of the speaker (e.g. a displayed indication connoting QUESTION TO ASK or NEED TO TALK); thereby allowing for orderly interruption of speakers without having plural participants trying to speak at the same time.

Another use of this facility would be to allow a conferee to request the conference server to adjust amplitude or other characteristics of audio signals currently being received by that conferee; whereby, for instance, a hearing impaired conferee could raise the volume of their received audio without affecting audio volume received by other participants.

Another use would be to allow a conferee to invoke a new "follow me" type of service during a currently active conference wherein e.g. the respective conferee's connection to the conference could be shifted/switched from a fixed line in the PSTN (e.g. at a respective office or residence) to a mobile radio link. Thus, a conferee could leave home or office to travel elsewhere without disconnecting from the conference and without affecting continuity of the conference.

Another use, if the PSTN conference center is suitably equipped with speech recognition apparatus and applications therefor, would be to allow a voice command over the PSTN conference connection to be detected by the speech recognition apparatus and used to server to control adjustment of a service condition in either the voice or data path or even in both paths (e.g. by displaying an indication to all participants stating or meaning LET'S TAKE A BREAK).

Another aspect of this arrangement is that the conference server can be configured and connected to support inclusion in a conference of "voice-only" and "data-only" participants, in addition to "voice and data" participants (the latter speaking and listening to voice, and sending and receiving data). Thus, a "voice-only" participant (e.g. a telephone user either without a computer or without concurrent access to the data network) could listen and speak to other participants, and a "data-only" participant (e.g. with access to the data network but either no telephone or no concurrent access to the PSTN for voice) could send and receive image data without hearing what is said about received data.

Another aspect is that "voice-only" connections could be set up without requiring telephone system operator intervention; for instance by having a conference master (e.g. the party who originated the respective conference) provide prospective voice-only participants with a pre-arranged password recognizable by speech recognition apparatus associated with the conference switching center in the PSTN, having each such prospective participant call a special number connecting to the speech recognition apparatus, and having the speech recognition apparatus and an associated software application transmit appropriate signals to conference management facilities of the associated switching center, upon detection of the spoken password, to have the latter establish an appropriate connection adding the caller to a currently active conference. The associated software application also could be used to signal the conference server to modify the currently displayed image so as to indicate addition of another conferee, and if desired the new conferee's name.

Another aspect of this arrangement is that it supports conferencing relative to a variety of different customer facilities; thereby supporting transfer of data between conferees using an external data network and other conferees having a data terminal linked to the PSTN, without access to any external data network, as well as transfer of voice between conferees using an external data network for voice transmission and other conferees relying exclusively on the PSTN for that function.

Another aspect is that this conference server arrangement could potentially make two-party multimedia conferences using the server more productive and efficient than comparable services using totally separate voice and data connections, and that the cost of such support could be small enough to allow for attractive pricing thereof to end users.

These and other aspects, features, advantages, benefits, and uses of our invention will be further understood by considering the following description and claims.

DETAILED DESCRIPTION

1. Definition of Terms

The following is a brief description of terms to be used in this description and their intended meanings:

LAN (Local Area Network) is a data communication network, either public or private, serving end users within a small area (e.g. within a building or geographically concentrated commercial enterprise)

WAN (Wide Area Network) is a data communication network serving a larger geographic area than a LAN. The Internet and World Wide Web (hereafter, Web) are "species" of public WAN systems that effectively span the world, and serve members of the public at large having appropriate hardware, software and communication access thereto.

PSTN (Public Switched Telephone Network) is the aggregate of all telephone communication resources available to members of the public at large; including resources providing local, long distance land-based, and wireless/cellular telephone services.

Server means a communication-oriented computer; usually with fast internal clock, large memory, large storage capacity, and general capability of sustaining concurrent data communication with multiple end users URL (Uniform Resource Locator) usually represents the address of a specific document, file or displayable page image on the Internet or Web. It consists of a collection of characters identifying the data, its origin (e.g. the server containing it) and a specific signalling protocol used for its transmission. A URL may be used by "browsing" software, at locations of Web end users, to designate a file to be retrieved from a remote server on the Web.

Conference call (or session) represents a voice connection service provided by the PSTN wherein two or more end users are connected so that each can speak and the others can hear what is said by the speaker. Participants in a conference call are herein termed participants, attendees, conferring parties or conferees.

2. Explanation of Problem Presently Solved

This invention concerns multimedia conferences wherein conferees concurrently may converse and exchange data, the latter including displayable text and graphic images. In today's facilities for multimedia transmission, data and voice are routed over separate paths such that it is difficult if not impossible to have presentations of image data coordinated with vocal presentations in a coherent manner.

Figure 1:
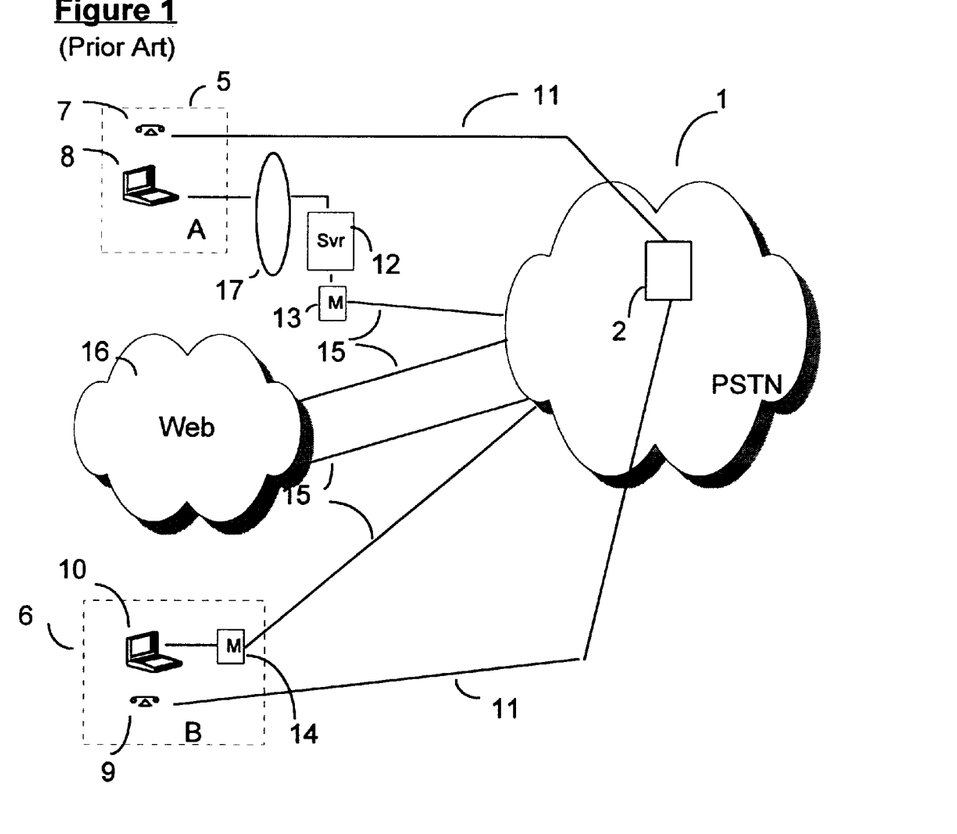
FIG. 1 schematically illustrates a prior art system for multimedia conferencing wherein data can not affect voice handling and voice can not affect data handling.

As exemplified in FIG. 1, a typical contemporary (prior art) facility of this kind routes voice signals exclusively through the PSTN, and data signals exclusively through a parallel public data network like the Web, but without any possibility for interaction between the two networks; e.g. to allow for coordination of display image presentation with vocal presentation, or to allow for data signal communications to alter services currently effective in the PSTN, etc.

The PSTN, shown at 1, has conference call managing and administering facilities 2 which oversee voice signal connections between conference participants but have no tie-in to simultaneous data transmissions between the participants. In FIG. 1, A and B represent two (of two or more) end-user stations currently having a conference connection on the PSTN. Equipment used at these stations are indicated respectively at 5 and 6. Station A's equipment 5 includes a telephone 7 and computer/display apparatus 8, and station B's equipment 6 includes a telephone 9 and computer display apparatus 10. Telephones 7 and 9 are connected through transmission lines 11 in the PSTN and (not shown) switches administered and controlled by the PSTN. Telephones 7 and 9 are not locally connected to respective computers in this illustration, but even if so connected neither the PSTN nor the Web could act to coordinate or otherwise interrelate voice and data transmissions; i.e. only the end users of these stations could act to coordinate data transfers with voice, by agreeing on a set of protocols beforehand, and such actions could not affect services provided in either network.

To exchange data in the typical arrangement of FIG. 1, conferees at stations A and B link to a server 12. The data is transferred e.g. through modems indicated at 13 and 14, transmission line paths shown collectively at 15, and a data communication network such as the Web shown at 16. In the illustrative example of this figure, server 12 and modem 13 are shown as locally accessible to station A and other not-shown stations via a LAN 17, and remotely accessible to station B via the Web 16 and modem 14. Thus, in the illustrated example, station A and the not-shown other stations could be computer stations within a building or a group of geographically proximate buildings (e.g. a building or buildings locally serving a business enterprise), and server 12 and modem 13 could be shared via LAN 17 by occupants of the respective building(s). Thus, the occupants would receive shared data handling and modem conversion services, rather than requiring separate data handling and modems at their individual offices or sites. In contrast, modem 14 is used only by station B and is within a few feet of the computer at that station.

In this configuration, modems such as 13 and 14 are required only for linkage to the applicable data network such as the Web. Also, server 12 can be located anywhere within communication reach of the respective set of stations that it serves (i.e. a WAN could be substituted for LAN 17 if necessary and/or appropriate). Furthermore, it should be understood that server 12 may be only one of plural servers through which the conferees exchange data. Although lines 15 between modems 13 and 14 are shown as passing through both the Web 16 and PSTN 1, in this example they have no connectability to the call management facilities 2 of the PSTN.

Figure 2:
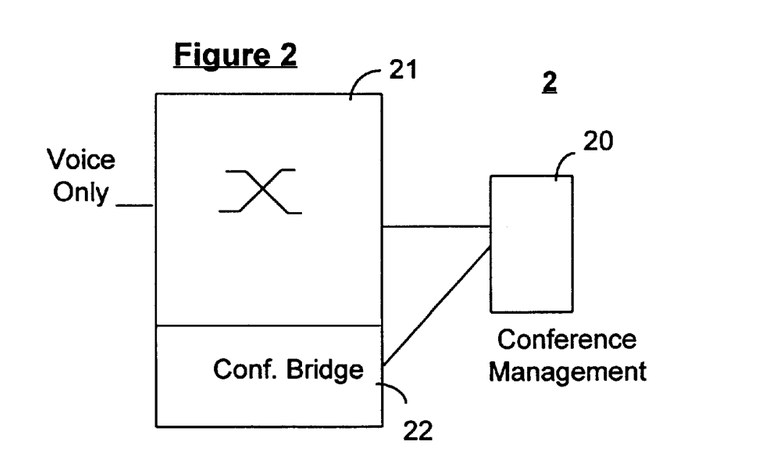
FIG. 2 is a block diagram illustrating PSTN elements for managing voice connections in the system of FIG. 1.

Referring to FIG. 2, the prior art call management facilities 2 include a call management system 20 (e.g. a computer system or the like) which manages and administers conventional switching apparatus 21 and conventional bridging apparatus 22 to establish and terminate conference call connections. Apparatus 22 comprises facilities allowing for voice signals to be amplified, summed and distributed among the conferees.

In this environment, functions and end user services provided by the Web are not affectable by voice signals in the PSTN, and conditions in the voice connection path are not affectable by signals sent through the data connection/Web.

Figure 5:
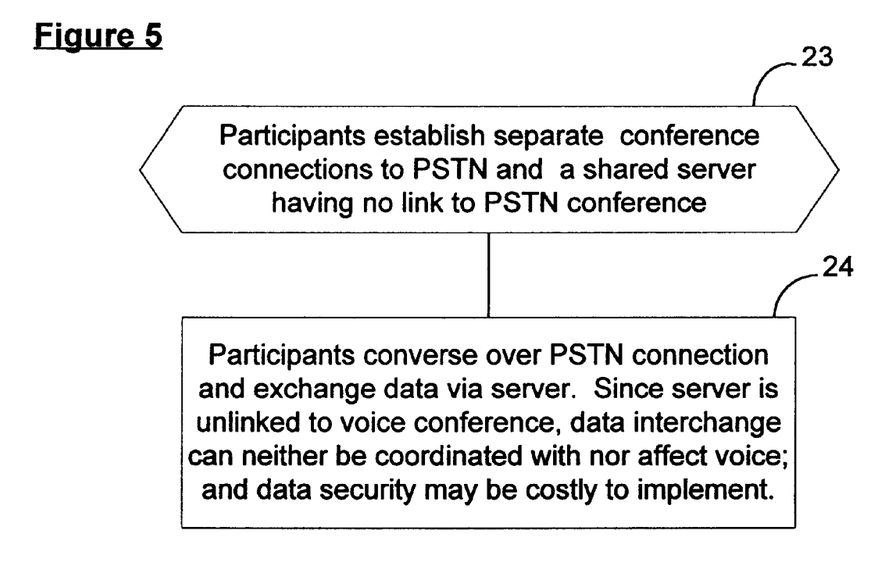
FIG. 5 is a chart providing an overview of how voice and data are handled in the prior art system of FIGS. 1 and 2.

FIG. 5 shows how a conference session is established and maintained in the prior art environment shown in FIGS. 1 and 2. As shown at 23, each participant establishes separate linkages to the PSTN and to a server such as 12 in the data networkWeb, the former exclusively for voice contact and the latter exclusively for data inter-change. Therefore, each participant requires simultaneous access to the PSTN and the data network via at least two physically or logically separate lines. Typically, in this environment, arrangements for the conference are made in advance and may require assistance of telephone system operators to link individual callers to the conference and announce their presence to those already participating. Usually, the advance arrangements define a maximum number of attendees, and once that number is reached no additional participants are permitted (unless and until one or more current attendees drop out of the conference).

As suggested at 24, this environment provides two concurrent but uncoordinatable conferences, one handling speech between the participants via voice connections within the PSTN, and the other handling movement of displayable data between them via the Web and servers such as 12. Such servers may be administered by either the Web or entities that are not part of either the Web or the PSTN, and they may have security facilities restricting external access to them which are costly to acquire and maintain. If the participants have facilities for collaboratively modifying displayed images, all must have corresponding non-standardized software applications permitting that collaboration.

Since the voice and data connections are separate and not inter-linkable, signals in either connection path can not affect services performed in the other path. Thus, data signals sent over the Web can not be used to prompt the PSTN to alter its current handling of the conference (e.g. to increase reception volume of a hearing impaired participant, or modify the connection of a participant from e.g. a fixed residential or office phone to a mobile radio unit), and voice signals can not be used to control or coordinate presentation of image data to the participants; e.g. in coordination with a voice presentation.

The present invention seeks to resolve these and other problems or shortcomings of existing multimedia conferencing arrangements, by incorporating conference server facilities into the PSTN which are effectively linked to both data network(s) such as the Web and the PSTN.

These conference servers are communication-oriented digital computer systems having communication links to both the PSTN and public data communication networks like the Internet, Web, etc., and their functions and sites of location are administered by the PSTN. The conference servers in general will be able to communicate with conference management resources of the PSTN. They also may be able to communicate with speech recognition apparatus and associated applications within a conference switching center of the PSTN so as to be able to react to voice commands issued by conferees; for example, commands to distribute data representing specific display images provided by the conferee issuing the command. These servers and their integration into the PSTN would enable the PSTN to offer cost-effective conference management services to its end users that are either completely new or presently considered impractical for existing PSTN facilities. Such services would include cost effective handling of voice conferences over conventional (unleased) lines in the "plain old telephone system" (POTS), concurrent with distribution of data over public data networks parallel to the PSTN (e.g. the Web), wherein conferees would be able to use their data network connections to control conditions of operation in the voice connection path, and conversely able to use voice commands to control functions performed in the data network, for example, to control distribution of image data in coordination with voice presentations Thus, a conferee would be able to administer and/or invoke specific services in either the PSTN or the parallel data network via signals sent on the other network. An example would be that a conferee could issue a "follow me" data request to switch their current voice connection (e.g. from a stationary phone to a mobile radio one), or another data request to have the amplitude or other parameters of voice transmitted to them changed (e.g. to adjust the sound delivered to a hearing impaired conferee).

Although conference calls on the PSTN heretofore usually have involved more than two participants, with our inventive arrangement a conference call may be used as an efficient method for two parties to converse while concurrently exchanging data (the term "efficient method" is used here to imply a process that could be more cost-effective and productive than a simple voice connection over the PSTN concurrent with a simple and completely separate data connection over the Web or another line path within the PSTN).

Those skilled in the art will recognize that the arrangement of FIGS. 1, 2 and 5 is not the only previously known technique for sustaining concurrent multimedia conferences. For instance, presently known software applications for the Internet/Web allow users of those networks and respective applications to effectively carry on "long distance" voice conversations using only local resources of the PSTN to link the users to locally accessible servers. These applications however have generally tended to provide voice transfer qualities inferior to (albeit cheaper than) equivalent long distance voice connections on the PSTN; generally due to the limited bandwidth available within public data networks today for such communications, and indefinite routing latencies (delays) of those networks.

There are also applications purporting to provide integrated handling of voice and data over data networks like the Web, as well as conferencing services in respect to such handling. But they too have limitations in respect to quality due mainly to bandwidth limitations deriving from the nature of today's network infrastructures and from the integrated handling of voice and data through common transmission paths. Furthermore, such arrangements are incapable of enabling their users to efficiently coordinate distribution of displayable data with voice presentations of respective users.

It is also possible for users to converse and transfer data concurrently over leased lines, but such lines would be considerably more costly than the type of conference services presently contemplated.

The present invention seeks to provide cost-effective conferencing of voice and data such that: 1) neither process is degraded by bandwidth limitations; 2) transmission of data between conferees can be coordinated efficiently with voice remarks of the conferees; and 3) services within either the PSTN or a parallel data network such as the Web can be efficiently administered and/or invoked by conferees during a conference.

3. The Present Solution

An overview of how the present invention solves the foregoing problems is presented in FIGS. 3, 4, 6 and 6*a*.

Figure 3:
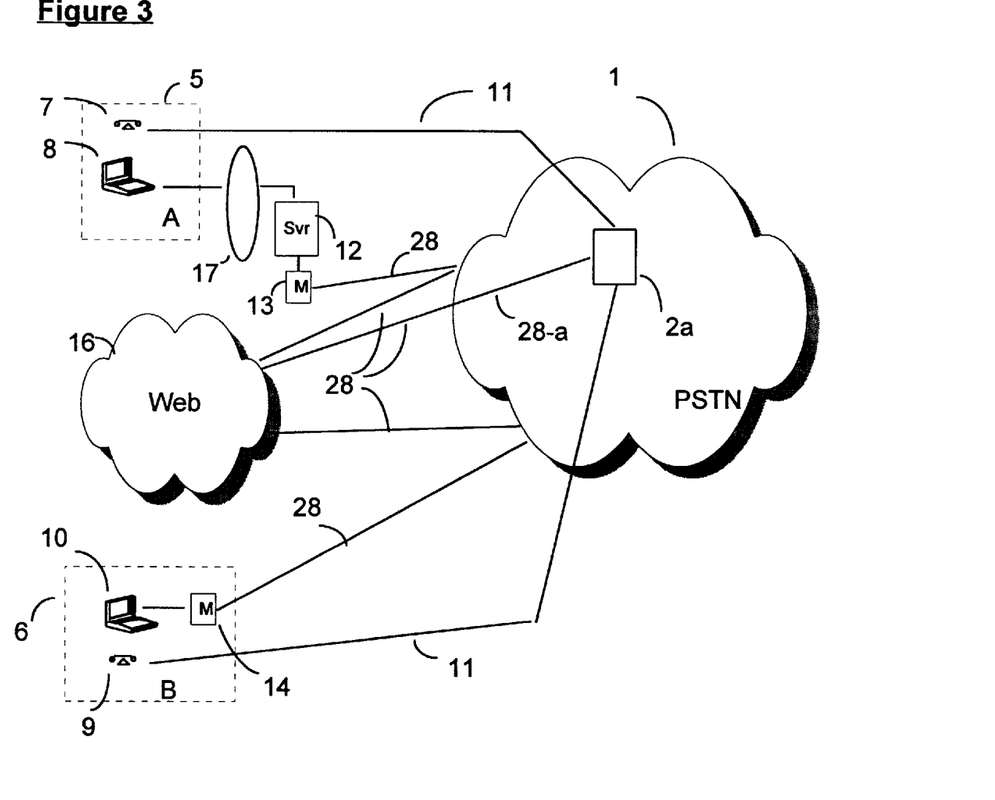
FIG. 3 schematically illustrates application of this invention to the system of FIG. 1.

FIG. 3 shows the arrangement of FIG. 1 modified in accordance with our invention. Elements functionally identical to those in FIG. 1 are denoted with identical numbers. Consequently this shows that novel elements of the invention are in the conference control center 2*a* and are associated at least in part with the data path represented by lines 28, 28-*a*.

Figure 4:
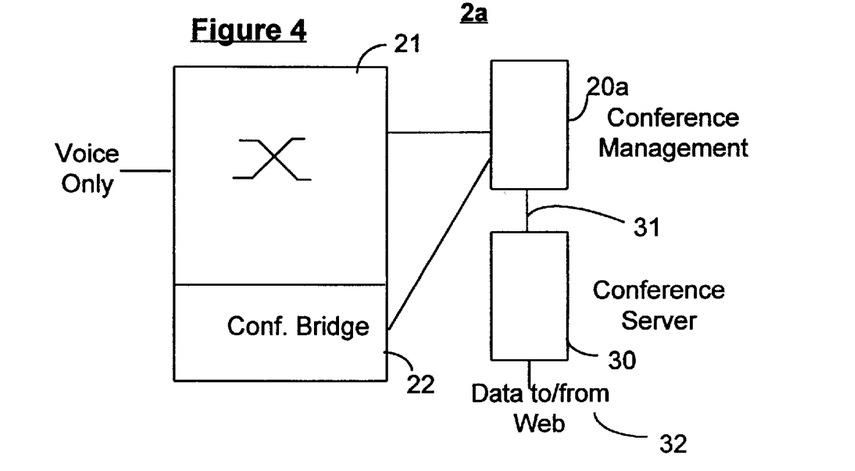
FIG. 4 is a block diagram illustrating PSTN facilities for the arrangement of FIG. 3.

FIG. 4 shows that conference center 2*a* includes a conference management system 20*a* and a conference server system 30. Conference server 30 is a communications adapted computer system maintained and administered by the PSTN. It's loose integration with call management resources of the PSTN, including its connection 31 to conference management facilities such as 20*a*, enable it to control services performed relative to an existing PSTN conference connection, in response to signals sent over a path external to the PSTN; exemplified by the indicated external connection(s) 32 to the Web (these connections being viewable as extending to line 28-a in FIG. 3).

These external connections permit new conferees to easily be added to an active conference without assistance of telephone company operators. Such added conferees may be pre-scheduled to join the conference at its inception, or they may join on an ad hoc basis, and their additions may be displayed to prior participants eliminating need for announcements by assisting telephone operators. They also enable conferees to easily and economically control other PSTN conference-useful services (either before or during a conference) without operator assistance; e.g. to vary connections of participants moving between fixed desk and mobile cellular telephones (in a manner further discussed later on).

Conference management system 20a differs from "prior art" conference management system 20 of FIG. 2 primarily in its connection 31 to conference server 30, and in functions and services derivative from that connection. As discussed later, speech recognition apparatus and associated applications within the PSTN may be linked to conference bridge 22, for recognizing voice commands of conference participants and enabling either management system 20a or the data network, or both, to perform actions associated with such commands; e.g. real time actions instantly affecting conditions in either the voice connection path, the data transmission path, or both.

It will also be shown later that although participating stations in the arrangements of FIGS. 1 and 3 have separate telephones and computers, as well as separate communication paths for each, the conference center arrangement of FIG. 4 would easily be adapted to serve conferees having only a telephone, or only a computer, or conferees having both a telephone and computer operating through a single physical line connecting to either the PSTN or the Web. Adjustments needed to support these reduced configurations are discussed later in this description. Furthermore, although station equipment external to the PSTN and Web is shown in FIG. 3 as identical to that in FIG. 1, it should be understood that this is done only to facilitate comparison of the present inventive solution to prior art. Therefore, it should be understood, and will become apparent from later parts of this description, that stations having many different forms of equipment are supportable by the present arrangement.

Figure 6:
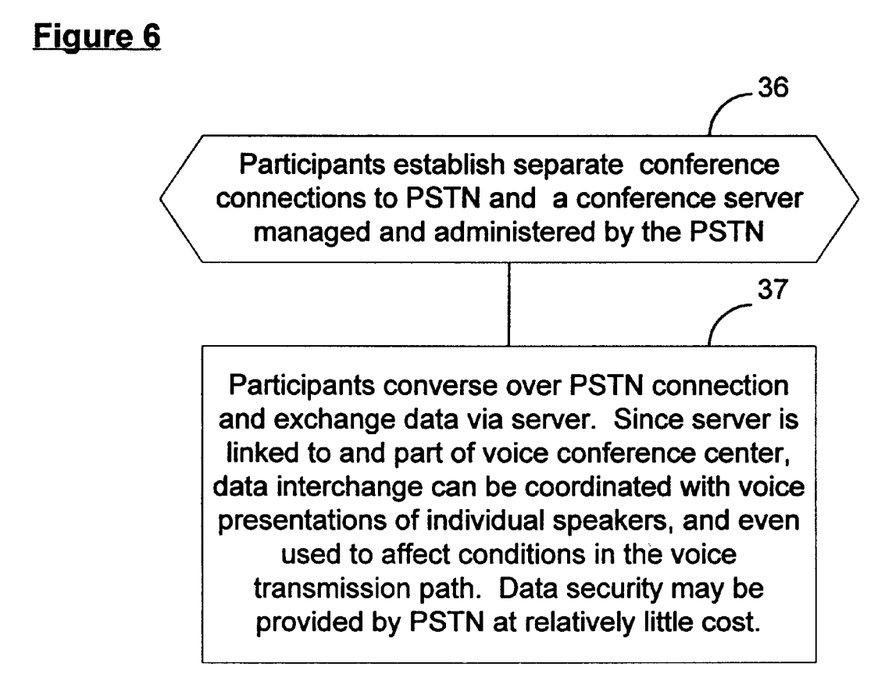
FIG. 6 is a chart providing an overview of how voice and data are handled in the system of FIGS. 3 and 4.

FIG. 6 provides an overview of capabilities afforded by the present conference server arrangement.

As indicated at 36, conference participants in both voice and data aspects of a conference still establish parallel voice and data connections over physically or logically separate lines extending to the PSTN and data network. However, as indicated at 37, data transferred between the conferees is funneled through conference server 30. Consequently, servers external to the PSTN may not be required for presently contemplated conference services, except perhaps for providing data collection, storage and distribution services within e.g. private enterprises (office buildings, plants, etc.). In other words, end users at self-contained participating stations like station B, having unshared data handling and modem facilities, need only link to PSTN conference servers such as 30 and need not have any direct links to other servers such as 12.

As suggested at 37, since server 30 has direct links to conference management facilities of the PSTN, image data transmissions on the Web are coordinatable with vocal aspects of the conference, and other data transmissions may be used by participants to alter or invoke services affecting their voice connections (e.g. volume of voice signals sent to them, interruption of speakers, switching phone connections e.g. from fixed lines to mobile radio links, etc.). Block 37 also indicates that data security may be provided by the conference server at "relatively small cost"; since that server and its functions are effectively shared by all users of the respective PSTN conference management and bridging facilities, rather than by potentially fewer users of (possibly a larger number of) servers such as 12, whence its security functions may be apportioned among a potentially larger population of users than that of servers such as 12 external to the PSTN. This should be more fully understood from the description below of FIG. 11.

Figure 6A:
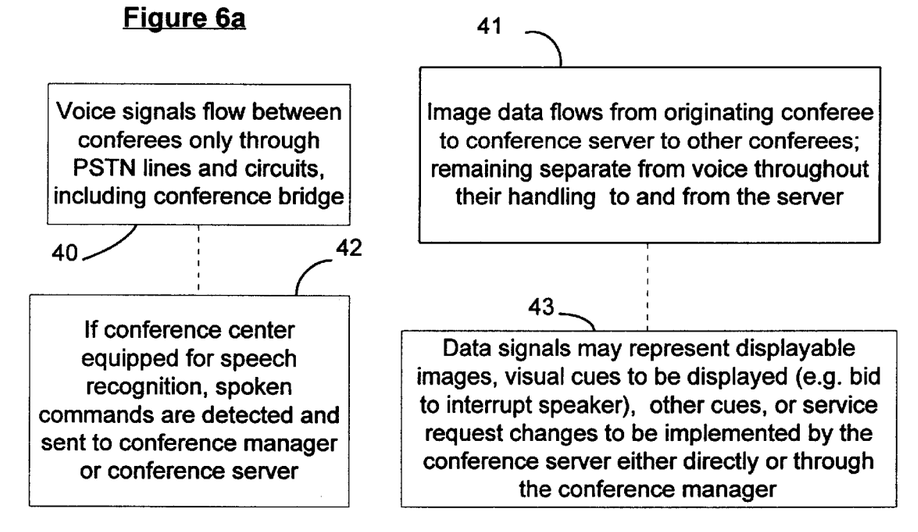
FIG. 6a is a chart elaborating on information given in FIG. 6.

FIG. 6a elaborates on functions indicated in FIG. 6. Voice signals flow only through switch and conference bridge connections in the PSTN (block 40). Data signals flow only through data connection paths between the conference server and conferees, generally through the Web, and generally over connection paths separate from the voice connection (block 41). Voice commands/requests may be detected by speech recognition apparatus in the PSTN, and used in associated control applications to initiate controlling actions by either the conference manager, the conference server or both (block 42); i.e. actions affecting conditions in either the voice path, the data path or both. Data passed through the data network includes data representing displayable images, and conferee requests and other control signals such as coordination cues (block 43). Cues may be signalled to the conference server by a conferee and handled by the conference server to appear as displayed icons or other viewable features at stations of other conferees (also block 43). Requests may be forwarded to the conference manager for handling if the associated functions are not directly controllable by the conference server, such as functions requiring changes of conditions in voice connection circuits (block 43).

It should be noted here that this invention contemplates that requests for changes in voice connection circuits may be sent to the conference server either over a data network such as the web or a third parallel communication network, such as a network handling two way pager communications for conferees equipped with two way pager units.

Figure 7:
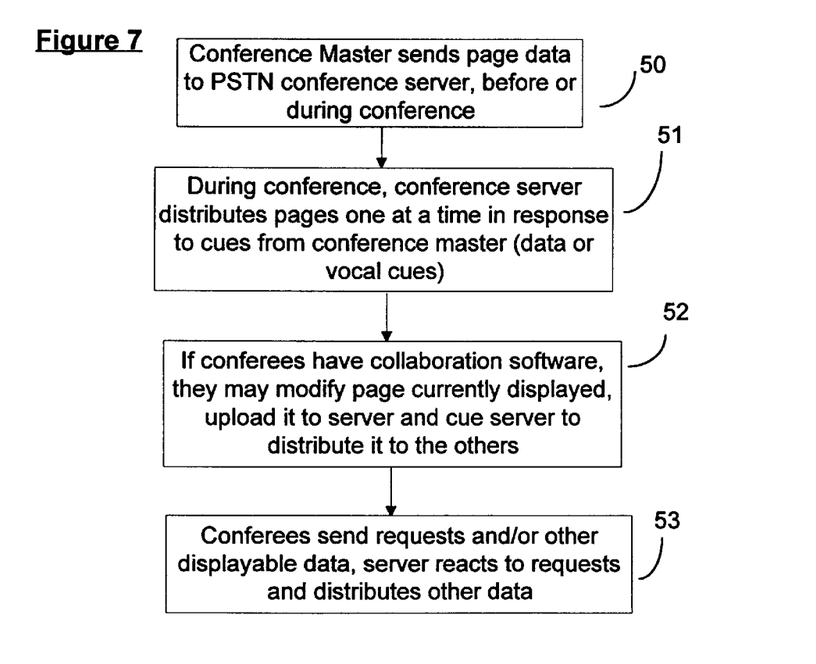
FIG. 7 is a flow diagram illustrating how the invention can be used to coordinate distribution and display of image data with voice presentations.

FIG. 7 illustrates how data representing displayable images (e.g. charts) may be presented to all conferees in coordination with a voice presentation by one of the conferees. The image data is sent by a conference master or moderator (e.g. a party originating the conference, a party owning or controlling the data, a party scheduled to make the voice presentation) to the conference server, either before or during the conference and stored by the conference server (block 50). Thereafter the data is distributed by the conference server, one page at a time in response to coordinating cues given by the voice presenter (block 51). Images stored in the conference server may be distributed to the conferees one at a time, for immediate display upon reception, and each page may be sent in response to a cue from the master/moderator. This cue may be manifested either as data representing a request to have the conference server distribute a specified chart (or a chart next in a predetermined sequence, etc.), or as an equivalent voice command picked by speech recognition apparatus linked to the voice connection of the conference and transferred to the conference server.

FIG. 7 indicates further that conferees having collaboration software (software enabling them to collaboratively edit a displayed image) may make editing changes to a currently viewed page and have the changes communicated to the other conferees via the conference server (block 52). Such changes may be communicated in any of several ways, either as transmissions indicating only the edited changes, or as transmissions including data representing the whole page with the edited changes, or in any other manner consistent with the intended communication effect.

Collaborative editing may be achieved in several ways. The method preferred presently would involve use at participating stations of browser software capable of receiving and executing mini-programs or "applets" suited to tasks required for performing collaborative modifications. Such applets may for instance be written in a commonly used language such as the Java™ language (Java is a Trademark of Sun Microsystems company), which is interpretable by a number of existing browsers constructed to interpret Java scripts (e.g. Netscape Navigator, Microsoft Explorer, etc), stored in the conference server, and transferred from the conference server to conference participants as the latter sign onto the data network for a conference session. These applets could be constructed to either self-destruct/erase at participant stations when a conference ends, or to remain stored at participant stations after a conference for use in future conferences (since the server would not easily distinguish which stations have previously transferred applets, the preferred method would be to distribute them as a conference begins and have them self-destruct at participant stations when the conference ends. Such applets could enable conferees to modify graphic and/or text elements of a currently displayed page image, and communicate modifications to the conference server for distribution to stations of other conferees.

A less preferred method would be to require all participants to have particular proprietary software (e.g. Lotus Notes) enabling them to create, edit and interchange displayable documents within a special communication environment required by that software.

As shown at 53, conferees requiring special services during a conference, that are invocable through the data connection, send data representing appropriate requests to the conference server, and the latter reacts appropriately to have the requested function performed if it is available. Box 53 also shows that conferees may send "other data" (data other than edited images originated by the conference master and requests for service changes) and that such other data may be distributed to the other conferees if appropriate.

Figure 8:
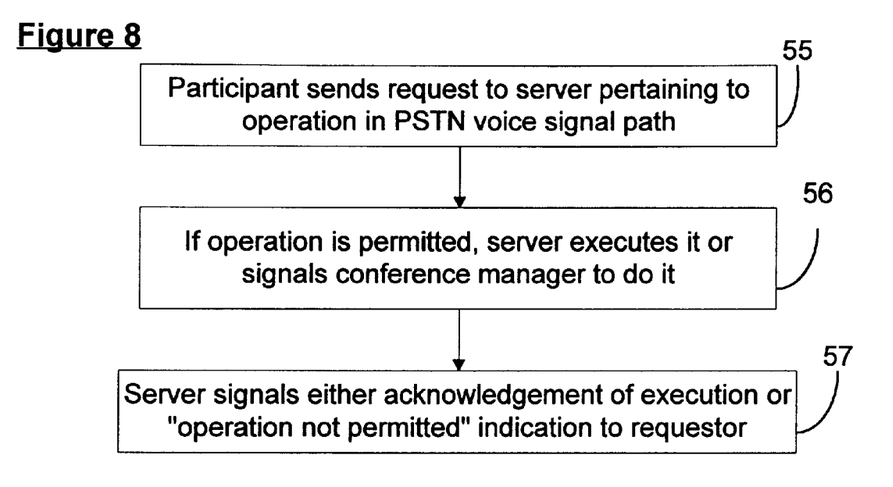
FIG. 8 is a chart showing how the invention can be used by a conferee to alter usage of or conditions in the voice path of a conference.

FIG. 8 illustrates an example of one such special service request for action pertinent to the voice conference. As shown at 55, data representing the request is sent to the conference server. As suggested at 56, the server determines if the requested service is available, and either takes action suited to the request directly or signals the conference manager to do so, depending upon where the requested action is executable. As seen at 57, the server then returns to the requester either an acknowledgement of the request or an indication that the requested service is unavailable.

Figure 9:
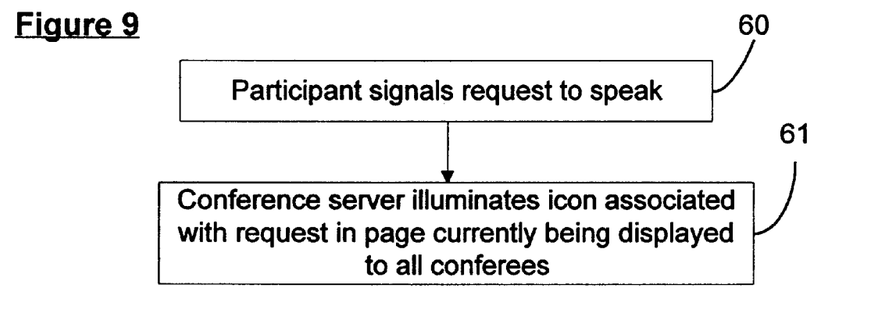
FIG. 9 illustrates how the procedure of FIG. 8 can be used to interrupt a speaker.

FIG. 9 gives an example of a data request pertaining to conditions in the voice circuits. In this example, the requestor seeks to interrupt a party currently speaking. At 60, the request is sent to the conference server, and at 61 the server responds by illuminating an icon on the image currently displayed to the participants; e.g. an icon representing ASK QUESTION, LET ME TALK, etc. This may be done either by signalling browsers at participant stations to modify the portion of the displayed image containing the icon, or by signalling that the current image is "stale" and requires reloading (in which case the browsers would request reloads and receive the current image with the icon illuminated), or by any other action resulting in an appropriate visual cue to the speaker that another party wants to speak.

Figure 10:
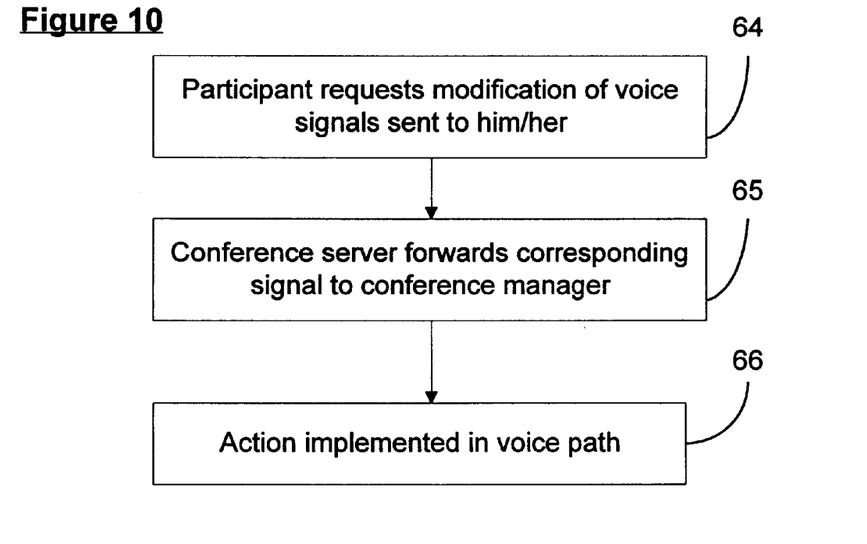
FIG. 10 illustrates how a similar procedure can be used to modify voice amplitude.

FIG. 10 illustrates another example of action pertaining to the voice conference. Here, the request (operation 64) is to alter a characteristic (e.g. volume) of voice signals that are being sent to the requester (e.g. a hearing impaired party). In this case, the conference server forwards a corresponding request to the conference manager (operation 65), and the latter takes action 66 relative to the voice path (conference bridge, etc.) to effect the desired change. A similar request action could be used to have the conference server and conference manager change the phone line connection of a requesting participant; e.g. to switch that participant's link to the conference from a fixed line (residential or office) to a mobile radio link. In this last example, the switching action could be implemented by having the conference manager first communicate with a mobile switching office to establish the mobile radio link to the conference bridge, and then act to sever the connection of the requestor's fixed line.

Figure 11:
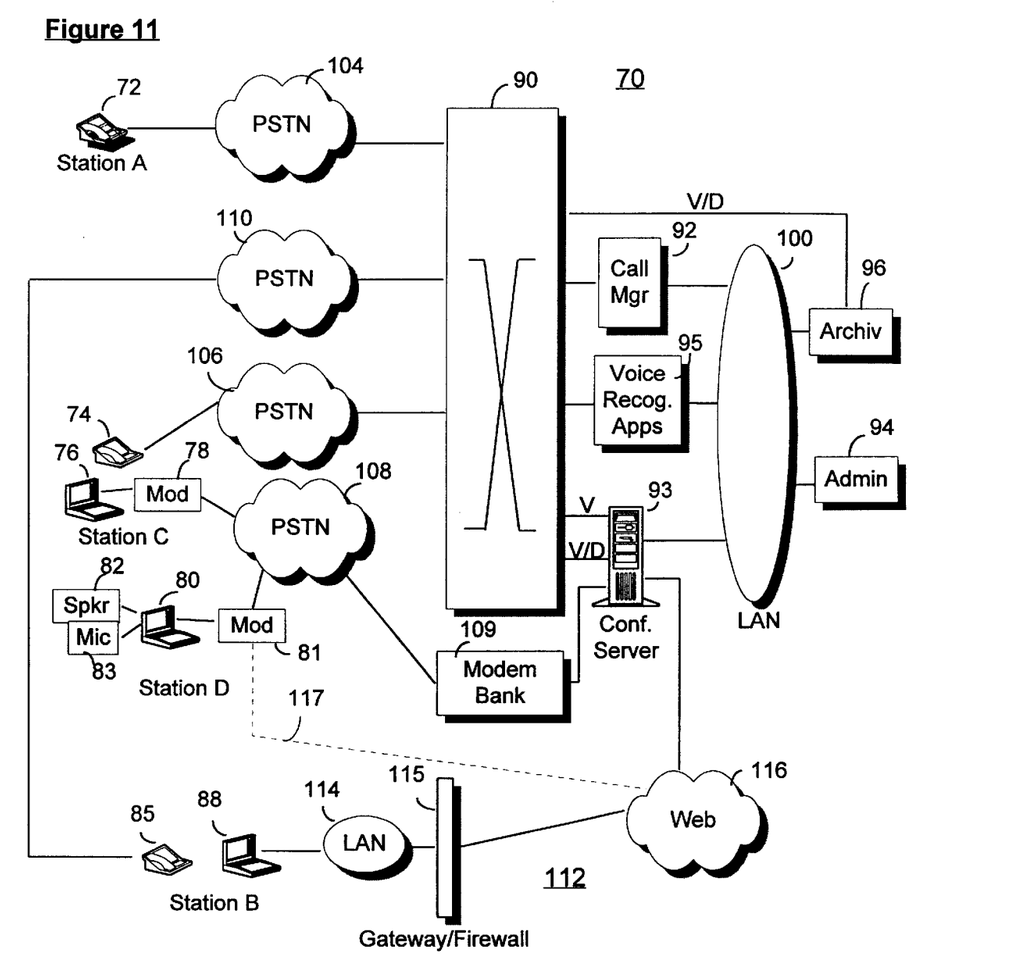
FIG. 11 illustrates a preferred embodiment of the invention.

FIG. 11 schematically illustrates a conference control system, in accordance with the present invention, which shows the different configurations of user stations that are supportable and how such support is given. As such, this may be considered as showing the best mode contemplated for carrying out our invention.

This figure shows four user stations—stations A, B, C and D—having various different configurations of equipment which for the following discussion are assumed to be actively connected, via conferencing center 70 in the PSTN, in a multimedia conferencing session (i.e. users of these stations are participants in that session).

Station A contains only a single analog telephone 72; i.e. its user is a voice-only participant in the conference. Station C contains an analog telephone 74, digital computer 76 and modem 78, with the telephone connecting to conference center 70 in a first connection path within the PSTN that is described below, and the computer and modem connecting in a physically separate second path within the PSTN, also described below; i.e. its user is a participant in both voice and data elements of the conference, whose voice and data flow through physically different paths within the PSTN. Station D contains only a computer 80, modem 81 and speaker 82 and microphone 84 both attached to the computer; i.e. its user is a voice and data participant whose voice and data are constrained to pass through the respective computer 80 and modem 81, and therefore have only a single physical path of connection to the conference center (which path, in the illustrated arrangement, is entirely within the PSTN). Finally, station B contains an analog telephone 85 and digital computer 88 which connect to the conference center through physically separate paths described below, one in the PSTN (the voice path) and the other external to the PSTN (the data path).

Computers at these stations (those other than station A) are shown as laptop style personal computers, but it is understood that they may be computers of any physical form (e.g. laptop, desktop, floor console, or even computers integral to an appliance such as a TV monitor), and need not even be personal type computers (i.e. they could even be computers like mainframes or such that are larger in size and operating capabilities than personal computers). The only requirement is that they contain browser software that is compatible with applets or scripts written in a common language such as Java, and that communicate with protocols that are compatible with those employed at the conference server to be described below.

Conference center 70 comprises call connecting circuits 90 containing switching circuits needed for simple non-conference connections as well as bridging circuits required for conference connections. The size and capabilities of this element are dependent upon the anticipated peak traffic in non-conference and conference calls for the respective conference center.

Conference center 70 also comprises a call management facility 92, a conference server facility 93, an administrative facility 94, an (optional) speech recognition facility 95 (for speech recognition applications including those relevant to conference management), and an (optional) archive facility 96 (for voice and data archiving applications that could e.g. allow voice and data portions of a conference to be replayed to conference participants at some later date). Facilities 92, 93, 95 and 96 have direct connections to connecting circuits 90 for handling signals to and from end user stations. All of the facilities 92–96 connect to a LAN 100 for communicating with each other. The connection circuits 90, facilities 92–96 and LAN 100 are all components of conference center 70, and the latter is a component of the PSTN.

Telephone 72 in station A connects to connecting circuits 90 through a part of the PSTN indicated at 104. Telephone 74 in station C connects to circuits 90 through a part of the PSTN shown at 106, while computer 76 and modem 78 in the same station connect to conference server 93 through another part of the PSTN 108 and a modem bank 109 (i.e. this station has two physically separate switch circuits affecting to the PSTN and having voice routed through the switch circuits 90 and data routed to the conference server over a path parallel to and separate from circuits 90). The computer 80 and modem 81 in station D connect to modem bank 109 via a link to PSTN portion 108 that is physically separate from that of modem 78 in station C. Consequently, the voice traffic associated with speaker and microphone attachments 82 and 83 in station D flows through computer 80, modem 81, PSTN portion 108, and modem bank 109, interspersed with any other data issued by or directed to computer 80; and all voice and data signals routed between modem 81 and PSTN portion 108 are in a common (analog) form.

Modem bank 109 serves to convert signals between analog and digital forms. Signals sent by modems 78 and 81 are converted to (baseband) digital form by modem bank 109 and passed to conference server 93 in the latter form. Signals sent by conference server 93 to modems 78 and 81 (and their respective computers) are converted in bank 109 from (baseband) digital form to analog form.

Telephone 85 in station B connects to circuits 90 via portion 110 of the PSTN, while computer 88 in the same station connects to conference center 70 through a path 112 external to the PSTN. Path 112 comprises a LAN 114 connecting computer 88 and other (not-shown) computers to conference server 93 through a gateway/firewall security element 115 and a portion 116 of the Web (or other data network).

Notice that the connections between conference server 93 and computers 78 (station C) and 80 (station D) are entirely within the PSTN (through modem bank 109, which is a component of conference center 70 and PSTN portion 108), whereas the connection between the server and computer 88 is external to the PSTN (i.e. through Web portion 116, and private network 114). Notice also that signals sent between modem bank 109 and computers 78 and 80 are analog in form, whereas those sent between server 93 and the modem bank are in digital form and those sent between server 93 and computer 88 are in analog form in transit through the Web and in baseband digital form in transit through LAN 114 and firewall 115. Signals passing between firewall 115 and the Web are converted between digital and analog forms through not-shown modems and other circuits located at the access node of the Web at which signals from the firewall pass into the Web and signals leaving the Web transfer to the firewall.

An optional direct connection between modem 81 and web portion 116 is suggested at 117, to indicate that the present conference server arrangement can be used to accommodate voice and data transmission through the web, and link voice portions thereof to voice conference facilities within the PSTN.

Conference server 93 has a voice only connection (V) to switch circuits 90 and a voice and data connection (VID) to the same circuits. These connections are required for routing some of the conference voice and data traffic between the participants, where the respective traffic signals are required to pass between connection circuits 90 and either modem bank 109 or the parallel data network 114–116 linked to station B. The voice only connection is used e.g. for routing analog voice signals through the server, between telephones 72 (station A), 74 (station C) and 85 (station B). The voice and data connection is used e.g. for routing analog voice signals through the server, between the speaker and microphone attachments to computer 80 at station D and any of the telephones at stations A, C and D, as well as for routing analog data signals exclusive of voice between computer 80 and the other station computers 76 (station C) and 88 (station B).

It should be noted that interspersed voice and data signals passed from station D to the conference server, via modem bank 109, usually will have to be separated at the server 93 to permit the voice signals to be transferred via circuits 90 to the telephones at the other stations, while the data is subjected to other handling (for example, storage in the server, or interpretation by the server as commands, cues or requests, etc.). Similarly, voice and data transferred to station D would have to flow through the modem bank and would have to be appropriately merged into a common form suitable for handling by modem 81 at station D. These separation and merger functions are state of the art logical functions that can be performed either in the modem bank by suitable logic, or by the server 93 if the data is in a form suitable for reading by that entity.

It should be understood that in conducting conference voice and/or data signals from conference connection circuits in the PSTN to external networks such as the Web, the present conference server would receive the respective signals along with an indication identifying the associated conference and route the respective signals to appropriate external paths applicable to the associated conference. Conversely, in conducting voice and/or data signals from an external source to the conference connection circuits in the PSTN, the conference server would receive the respective signals, recognize the conference associated with their origin, and transfer the signals to the PSTN connection circuits along with an identification of the associated conference, causing the signals to be routed over telephone company circuits and lines to destinations appropriate for that conference.

It should be recognized that the foregoing arrangement would be readily adaptable to perform any or all of the following functions:

add conferees to an existing conference (either predetermined individuals or others entering on an ad hoc basis) without telephone operator assistance;

announce entry of new conferees via computer displays, also without operator assistance drop conferees from an existing conference without operator assistance;

split a conference into separate sub-conferences involving discrete sub-groups of the group participating in the parent conference;

selectively block portions of a conference (voice and/or data) from presentation to some participants; e.g. to present confidential data to participants authorized to receive such and block it from participants not authorized to receive it.

The foregoing and other aspects of the invention will be further appreciated from the following claims.

We claim:

1. A voice and video conferencing system, for the public switched telephone network (PSTN), said PSTN having conferencing circuits entirely internal thereto for routing analog voice signals between end users of said PSTN, and also having conference management facilities entirely internal thereto for managing operations in said conferencing circuits to provide conference connections between said end users; said conferencing system comprising:

a conference server communicating with said conference management facilities to form an extended conference management facility operating as an internal part of said PSTN;

said conference server having controlling connections to both said internal conferencing circuits and a data communication network external to said PSTN; said controlling connections enabling said conference server to direct transfers of data signals through said external network in coordination with a voice conference instantly established in said internal conferencing circuits; said data being transferred in parallel through said external data network, between participants to said established voice conference having connections to said external network, in coordination with voice signals transmitted between said participants through said internal conferencing circuits; said data being transferred including data representing displayable video images and data representing functional requests and commands issued by individual said participants and requiring attention by said extended conference management system; said functional requests including data transfer requests, routed from a said participant to said conference server, to have said conference server manage distribution of data representing said displayable video images, said image data having been previously furnished to said conference server by a participant issuing the request, to other said participants;

said controlling connections and requests being used to have said extended conference management facility distribute said data representing said displayable video images between said conference participants in coordination with a vocal presentation instantly being made by a requesting participant; said controlling connections, requests, and commands further being used for having said extended conference management facility perform controlling functions relative to both said internal conferencing circuits and said external data network.

2. A voice and data conferencing system in accordance with claim 1 wherein said controlling connections between said conference server and both said conferencing circuits and conference management facilities are used, in response to certain said functional requests, to signal said conference management facilities to vary conditions of operation in said conferencing circuits.

3. A conferencing system in accordance with claim 1 wherein said PSTN includes:

speaker-independent speech-recognition means linked to said conferencing circuits for detecting spoken commands and functional requests uttered by said participants; and means linking said speech-recognition means to said conference server for enabling said conference server to execute controlling functions relative to said external data network in response to said spoken commands; and wherein said conference server comprises:

means responsive to signals received from said speech-recognition means for distributing individual pages of said displayable image data to said participants and for performing other functions relevant to said voice conference of aid participants.

4. A conferencing system in accordance with claim 2 wherein said signals to said conference management facilities to vary conditions in said conferencing circuits are used to cause the telephone connection of a said conference participant to be changed so as to enable the respective participant to change between wired and wireless channels of connection to said PSTN without interrupting continuity of a currently active conference.

5. A conferencing system in accordance with claim 2 wherein said signals to said conference management facilities to vary conditions in said conferencing circuits are used to effectively vary the volume of sound currently being delivered to a telephone receiver used by one of said participants.

6. A conferencing system in accordance with claim 1 wherein said controlling connections between said conference server and said conferencing circuits are useful to enable said conference server to transfer signals representing voice and video information between said internal conferencing circuits and voice and video handling equipment connected to said external data network, and also to enable said conference server to transfer signals representing video data between said video handling equipments connected to said external data network; thereby enabling PSTN end users lacking connections to said data network to send and receive data relative to the data network via the PSTN.

7. A conferencing system in accordance with claim 1 wherein said external data network is a public data network that is accessible to any member of the public complying with requirements of the respective network.

8. A conferencing system in accordance with claim 1 wherein said conference server is effective to form a circuit path between said internal conferencing circuits in said PSTN and said external data network for selectively routing signals representing both voice and data between said conferencing circuits and said external data network.

9. A conferencing system in accordance with claim 8 wherein said circuit path formed by said conference server enables said PSTN and external data network to support conferences between conference participants having different equipment and different communication connections including but not limited to any and all of the following:

a participant having a conventional telephone linked to the PSTN and a computer separately linked to said external data network;

a participant having only a conventional telephone linked to the PSTN;

a participant having only a computer linked to said external data network; said computer unequipped for handling voice;

a participant having only a computer linked to said external data network; said computer being equipped for handling both voice and data transmissions relative to the respective participant;

a participant having only a device linked to said external network; said device being equipped only for handling voice communications relative to the respective participant; and a participant having only a computer linked to said PSTN; said computer being equipped for handling both voice and data transmissions relative to said PSTN.

10. A conferencing system in accordance with claim 1 wherein said PSTN includes speaker-independent speech recognition means connected to said conferencing circuits for responding to voice commands uttered by said conference participants and said connections between said conference server and said conferencing circuits and said conference management facilities are effective to link said conference server to said speech recognition means.

11. A conferencing system in accordance with claim 10 wherein said connections between said conference server and said conferencing circuits, said conference management facilities and said speech recognition means are provided by a data communication network internal to said PSTN.

12. A conferencing system in accordance with claim 11 wherein said internal data communication network is a local area network (LAN).

13. A conferencing system in accordance with claim 1 wherein said PSTN includes a modem bank within said PSTN forming signal transmission paths internal to said PSTN but parallel to said conferencing circuits and said conference server includes:

means linking said conference server to said modem bank for routing voice and data signals between said internal conferencing circuits and said modem bank and between said external data network and said modem bank.

14. A conferencing system in accordance with claim 13 wherein said conference server is effective to:

separate voice and data signals received in said modem bank from a single said participant;

route the separated voice signals to said conferencing circuits for connection to telephones of all conference participants having telephones; and selectively route some of the separated data signals to said conferencing circuits, for delivery to participants having computers directly connected to said PSTN, and route the remaining separated data signals to said external data network for delivery to participants having computers directly connected to said external data network.

15. A conferencing system in accordance with claim 1 wherein said conference server and conferencing circuits are jointly effective to allow any of the following actions to be implemented, without telephone operator assistance, relative to said conference between said participants:

add predetermined participants to said conference;

add new participants to said conference on an ad hoc basis;

selectively remove (disconnect) participants from said conference;

display additions of new participants and removal of old participants as they occur;

permit said conference to be sub-divided into plural sub-conferences between subgroups of the participants in said conference;

block portions of a conference relative to a subset of its current participants (e..g. to prevent unauthorized participants for listening to and/or viewing confidential information).

16. A voice and data conferencing system for use exclusively within the Public Switched Telephone Network (PSTN) comprising:

apparatus interfacing between the PSTN and an external data communication network, during a voice conference established in said PSTN, for transferring signals representing voice between internal conferencing circuits of the PSTN and voice transmitting and receiving equipment connected to said external data network, and also for directing transfers of signals representing viewable images related to said voice conference between devices connected to said external data network and between the PSTN and said devices; said apparatus further being able to coordinate transfers of said viewable image data with said established voice conference so that a party speaking to other participants in said voice conference can have viewable documents presented to said other conference participants in coordination with and in association with what is being said by the speaking party.

17. A method of adapting existing conference management facilities in the Public Switched Telephone Network (PSTN) to support efficient conferencing of voice and video information, said method comprising:

establishing a server interface internal to the PSTN between said conference management facilities and a data communication network external to the PSTN;

connecting said server interface directly to said conference management facilities and PSTN conferencing circuits controlled by said conference management facilities;

adapting said server interface and said conference management facilities to allow for:

a) routing signals representing video information through said server interface between internal signal transmission circuits in said PSTN and said external data network, wherein said signals are routed between participants in a voice conference instantly established in said conferencing circuits; and b) coordinating transfers of said video information pertinent to what is being instantly said in said voice conference directly with what is being said in said conference; thereby enabling an instantly speaking party to said voice conference to present video images pertinent to and in coordination with what the speaking party is instantly saying to other participants in said conference.

* * * * *